3,040,079
ORGANOZINC SOLUTIONS IN N,N-DIALKYLAMIDES AND A PROCESS FOR THEIR PREPARATION

Robert Joly, Montmorency, and Robert Bucourt, Villiers-le-Bel, France, assignors to Roussel-UCLAF, Societe Anonyme, Paris, France, a corporation of France
No Drawing. Filed Feb. 26, 1960, Ser. No. 11,167
Claims priority, application France June 5, 1959
5 Claims. (Cl. 260—429.9)

The present invention relates to solutions of organozinc salts in N,N-dialkylamides and a process for their preparation. Most particularly it has as its object the solutions of these zinc derivatives of lower alkyl halides, usually called mixed organozinc halides, in N,N-di-lower-alkylamides.

The solutions of the organozinc salts in N,N-dialkylamides obtained according to the present invention constitute important reagents for organic synthesis which are different in their behavior from classic organozinc compounds obtained in solution in ether or tetrahydrofuran. It will be seen as the description proceeds, that they make it possible, for example, to prepare very easily methylchromone starting from o-hydroxypropiophenone and ethyl formate.

The object of the invention is the obtention of solutions of organozinc salts having the formula, $R_1ZnX$, in N,N-dialkylamides having the formula,

wherein $R_1$ and $R_2$ are lower alkyl, $R_3$ is a member selected from the group consisting of hydrogen, methyl and ethyl and X is a member selected from the group consisting of halides, methosulfate and ethyl sulfate radicals.

A further object of the invention is the development of a process for the preparation of said solutions of organozinc salts in N,N-dialkylamides.

Another object of the invention is the process for the preparation of 3-methylchromone from o-hydroxypropiophenone and ethyl formate utilizing said solutions of organozinc salts in N,N-dialkylamides.

These and other objects of the invention will become more apparent as the description proceeds.

We have discovered that stable solutions of organozinc salts having the formula, $R_1ZnX$, in N,N-dialkylamides having the formula,

wherein $R_1$ and $R_2$ are lower alkyl, $R_3$ is a member selected from the group consisting of hydrogen, methyl and ethyl and X is a member selected from the group consisting of halides, methosulfate and ethyl sulfate radicals, can be readily prepared and are useful in the synthesis of organic compounds.

The process for the preparation of these organozinc solutions, which is the object of the present invention, consists essentially of reacting the desired alkyl compound, $R_1X$, wherein $R_1$ and X have the meanings assigned above, direct with zinc in the presence of an N,N-dialkylamide having the formula,

wherein $R_2$ and $R_3$ have the meanings assigned above, preferably in N,N-dimethylformamide, but other dialkylamides such as N,N-dimethylacetamide, N,N-diethylformamide, N,N-diethylacetamide, N,N-dimethylpropionamide, etc., may also be used.

In general, the reaction is carried out at slightly elevated temperatures which are readily attainable in industry, advantageously between 20° and 100° C.

As alkyl compounds having the formula, $R_1X$, we can use such compounds as methyl iodide methyl bromide, ethyl bromide ethyl chloride, propyl iodide, n-butyl bromide, isopropyl bromide, isoamyl bromide, dimethyl sulfate, diethyl sulfate, etc. The methyl derivatives are preferred when preparing organozinc compounds for organic synthesis, and these and the other alkyl derivatives are preferred when preparing organozinc compounds for use as alkylating agents.

In order to activate the reaction, it is often advantageous to employ a catalyst, such as the iodide of the alkyl derivative in question.

The following examples, which are non-limiting, describe the preparation of a number of solutions of organozinc salts in N,N-dialkylamides as well as their isolation. The particular advantage of these solutions of organozinc salts is illustrated by an example of the preparation of methylchromone in excellent yields. The temperatures are indicated in degrees centigrade.

EXAMPLE I

*Preparation of a Solution of Methylzinc Iodide*

200 gm. of zinc (in the form of powder, leaflets or chips) are introduced into 200 cc. of dimethylformamide and 39 gm. of methyl iodide. The reaction commences as soon as the temperature is elevated and is exothermic. While continuously cooling in order to maintain the temperature at 40° to 45° C., 350 gm. of methyl iodide in 470 cc. of dimethylformamide are added over the course of about one hour. After the addition is terminated the mixture is maintained for an additional 30 minutes at 40° to 45° C. Thereafter the solution is diluted while agitating with 500 cc. of dimethylformamide, and cooled to 25° C. The methylzinc iodide ($CH_3ZnI$) content is determined as 1.72 mol/kg., which corresponds to 98% of the zinc originally present.

EXAMPLE II

*Preparation of a Solution of Methylzinc Bromide*

A slow stream of methyl bromide is made to bubble through a mixture of 200 gm. of zinc, 150 cc. of dimethylformamide and 5 cc. of methyl iodide (as catalyst) while agitating the mixture. The temperature slowly rises to 100–110° C., at this point, the mixture is cooled on an ice-water bath to 50° C., the rate of flow of methyl bromide is accelerated and simultaneously approximately 350 cc. of dimethylformamide are introduced within a half hour. Methyl bromide is continuously bubbled through the mixture at a temperature of 50° C. until all of the zinc completely disappears, which takes approximately 2 to 3 hours. The methylzinc bromide generally crystallizes out at the end of the preparation at temperatures of 40° to 45° C. After the reaction is complete, the reaction mixture is reheated to 55° C. in order to obtain complete dissolution. The weight of the reaction mass is from 1,020 to 1,040 gm. The methylzinc bromide solution titrates at 2.8 to 2.9 mols per kg.

EXAMPLE III

*Isolation of Methylzinc Bromide*

It is possible to isolate the methylzinc bromide starting from its solution in dimethylformamide. The procedure is as follows: At the moment when the first signs of crystallization begin to appear in the solution prepared according to Example II above, 70 cc. of butyl acetate are added to 150 gm. of the methylzinc bromide solution, while working in an atmosphere of nitrogen. The mixture is agitated, cooled and allowed to stand at room temperature overnight. The following morning the mother liquor which covers the crystals of the zinc compound is removed by syphoning it off. 50 cc. of butyl acetate are added, the mixture is agitated for 15 minutes and is then allowed to stand. The mother liquor is again removed, 50 cc. of butyl acetate are again added and the mixture is again agitated and then allowed to stand. After removal of the mother liquor, an analysis of the crystals shows that they consist of a solvated mixture composed of one molecule of methylzinc bromide and two molecules of dimethylformamide.

EXAMPLE IV

*Preparation of a Solution of Methylzinc Chloride*

100 gm. of zinc are introduced into 100 cc. of dimethylformamide, and then 2 cc. methyl iodide (as a catalyst and reaction initiator) are added to the mixture. After commencement of the reaction, methyl chloride is bubbled through the mixture for four hours while maintaining the reaction mixture at a temperature of about 80° C., first by cooling and then by heating slightly. During this period 370 cc. of dimethylformamide are added. After the addition of methyl chloride is completed, the mixture is heated for an additional half hour. After cooling, 540 cc. of dimethylformamide are again added and a yellowish green solution of methylzinc chloride is obtained. Under these conditions, 70% of the zinc originally present is transformed into methylzinc chloride.

EXAMPLE V

*Preparation of a Solution of Methylzinc Methosulfate*

15 gm. of zinc powder are introduced into 30 cc. of dimethylformamide containing 5 cc. of dimethyl sulfate and 1 cc. of methyl iodide (as catalyst). The mixture is agitated. The temperature reaches 45° C. within 5 minutes. The mixture is cooled and a solution of 15 cc. of dimethyl sulfate in 20 cc. of dimethylformamide is added at 40° C. over a period of 20 to 25 minutes. An exothermic reaction is observed for an additional 35 minutes. Thereafter, the reaction mixture is allowed to cool to 20° C. over a period of two hours. By titration, there is present 1.95 mols per kg. of methylzinc methosulfate, that is a transformation of 80% of the zinc originally present in the preparation.

The following table shows, in relation to the temperature and the duration of the heating, the quantities of organozinc salts present in solution in dimethylformamide formed from other alkyl derivatives.

| Example | Compound Obtained | Temperature, °C. | Duration of Heating, hours | Quantity of zinc transformed into zinc compound (in percent) | Remarks |
|---|---|---|---|---|---|
| VI | ethylzinc bromide. | 35 | 5½ | 45 | Initiation with ethyl iodide. |
| VII | isopropylzinc bromide. | 55 | 18 | 59 | Initiation with isopropyl iodide. |
| VIII | butylzinc bromide. | 90 | 5 | 59 | |
| IX | isoamylzinc bromide. | 105 | 2 | 53 | |

Other N,N-dialkylamides can be used which are liquid at the temperatures employed to replace dimethylformamide in the above examples with little if any difference in the course of the reaction or the yields.

EXAMPLE X

*Preparation of 3-Methyl-Chromone With Methylzinc Bromide*

A stream of methyl bromide is introduced into a mixture consisting of 90 gm. of powdered zinc, 66 cc. of dimethylformamide and 3 cc. of methyl iodide (as catalyst). The temperature reaches 50° C. in 10 minutes and at that point the reaction proceeds fairly vigorously. The reaction mixture is cooled to maintain the temperature at about 50° C. and 156 cc. of dimethylformamide are introduced over a period of one hour. The flow of methyl bromide is maintained until all of the zinc has completely disappeared which requires 3½ hrs. At the end of the reaction it is necessary to maintain the temperature at 50° C. by heating.

The reaction mixture is then cooled to 30° C. and 67.5 cc. of ethyl formate are introduced over a period of 10 minutes. 50 gm. of o-hydroxypropiophenone are then added over a period of one hour. A reaction develops which is accompanied by the evolution of methane. Thereafter, the reaction mixture is heated to 60° C. until the evolution of gas ceases, which requires approximately three hours. The mixture is cooled to 20° C. and the excess of methylzinc bromide is decomposed by the very slow addition of 88 cc. of acetic acid. Thereafter the mixture is diluted with 1700 cc. of water and extracted with 600 cc. of ethyl acetate and then four times with 250 cc. aliquots of the same solvent. The combined extracts are washed with water, with a saturated solution of sodium bicarbonate and again with water. After drying over sodium sulfate the solvent is distilled off in a vacuum to yield 50.9 gm. of a thick oil. This oil is distilled in a vacuum (17 mm. Hg) to obtain 6.2 gm. of a first fraction having a boiling range up to 148° C. and 37.5 gm. of principal fraction having a boiling range of 148° to 150° C. The principal fraction (yield=70%) is practically pure 3-methylchromone having a melting point of 71°–72° C. The first fraction is made up of 3-methylchromone contaminated with a small amount of o-hydroxypropiophenone. The first fraction is subjected to a treatment with 10 cc. of 1 N sodium hydroxide by trituration. The mixture is then vacuum filtered, the filter cake is washed with water and dried at 40–50° C. to give 5.875 gm. (which is 11%) of 3-methylchromone melting at 71–72° C., or an overall yield of about 81%.

For optimum results in utilizing the solution of an organozinc salt in an N,N-dialkylamide it is preferable to maintain a fairly concentrated solution. The concentration should be above about 0.1 mol of organozinc salt for every kilogram of solution and below the saturation point for the particular organozinc salt. For use in chemical synthesis, however it is obvious that more dilute solutions may be employed at the expense of reaction speed and completeness.

The preceding examples are illustrative of the invention. It is to be understood, however, that these specific embodiments are non-limiting and other alternative procedures, as would occur to one skilled in the art can be employed without departing from the spirit of the invention or the scope of the appended claims.

We claim:

1. As a chemical reagent, a stable solution of an organozinc salt having the formula, $R_1ZnX$, in an N,N-dialkylamide having the formula,

wherein $R_1$ and $R_2$ are lower alkyl, $R_3$ is a member selected from the group consisting of hydrogen, methyl and ethyl and X is a member selected from the group consisting of halide, methosulfate and ethyl sulfate radicals.

2. As a chemical reagent, a stable solution of methylzinc bromide in dimethylformamide containing between about 0.1 to 2.9 mols of methylzinc bromide per kilogram of solution.

3. As a chemical reagent, crystals of methylzinc bromide containing about 2 molecules of dimethylformamide of solvation for each molecule of methylzinc bromide.

4. A process for producing a stable solution of an organozinc salt having the formula, $R_1ZnX$, in an N,N-dialkylamide having the formula,

wherein $R_1$ and $R_2$ are lower alkyl, $R_3$ is a member selected from the group consisting of hydrogen, methyl and ethyl and X is a member selected from the group consisting of halide, methosulfate and ethyl sulfate radicals which comprises the step of reacting metallic zinc with an organic compound having the formula, $R_1X$, wherein $R_1$ and X have the above-assigned meanings at a temperature between about 20° and 100° C. in the presence of an excess of an N,N-dialkylamide having the formula,

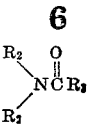

wherein $R_2$ and $R_3$ have the above-assigned meanings.

5. A process of producing a stable solution of methylzinc bromide in dimethylformamide containing between about 0.1 to 2.9 mols of methylzinc bromide per kilogram of solution which comprises the steps of reacting metallic zinc with methyl bromide in the presence of a catalytic amount of methyl iodide and an excess of dimethylformamide at a temperature between about 20° and 100° C., until the metallic zinc disappears and diluting to the desired concentration with dimethylformamide.

References Cited in the file of this patent

UNITED STATES PATENTS

| 2,769,015 | Mentzer | Oct. 30, 1956 |
| 2,792,407 | Heininger | May 14, 1957 |
| 2,849,468 | Cardinal | Aug. 26, 1958 |
| 2,942,017 | Petree | June 21, 1960 |

OTHER REFERENCES

Rochow et al.: "The Chemistry of Organometallic Compounds" (1957), pages 100–105.